2,991,325
ELECTROLYTES FOR RECHARGEABLE DRY CELL
Karl Kordesch, Lakewood, Ohio, assignor to Union Carbide Corporation, a corporation of New York
No Drawing. Filed June 17, 1958, Ser. No. 742,489
6 Claims. (Cl. 136—155)

This invention relates to electrolytes for use in conjunction with rechargeable dry cells of the alkaline type.

In my co-pending application entitled "Rechargeable Dry Cell," Serial No. 689,083, filed October 9, 1957, there is described a rechargeable dry cell comprising an hermetically sealed metallic container serving as the positive terminal thereof, a tubular cathode consisting of carbon and manganese dioxide particles fitting in the container, finely divided zinc particles mixed with alkaline electrolyte separated therefrom by means of a fibrous separator and contact means reaching the zinc particles. This cell is protected against accumulation of gas on overcharge by the recombination reaction occurring between the zinc particles and the oxygen formed during overcharging. This protection is effective only in those cells having a sufficiently large anode surface available for the oxygen to react with the zinc.

Similarly when a discharged cell of the type above outlined and having an amalgamated zinc anode is recharged, the pure zinc being redeposited at the anode should be spontaneously amalgamated. In those instances where this reaction does not occur, the pure zinc and the amalgamated zinc will form local galvanic cells yielding from 20 to 40 millivolts with consequent resulting corrosion and gassing of hydrogen. Some producers of rechargeable alkaline dry cells solve this problem by omitting the amalgamation of the zinc. This practice considerably reduces the shelf life of charged cells.

The main object of the present invention then is to provide means for preventing the development of excessive gas pressure on overcharging of rechargeable alkaline dry cells, which means will also facilitate the rapid amalgamation of redeposited zinc.

This object is attained in the practice of the invention by adding to an alkaline electrolyte consisting of a hydroxide of an alkali metal elemental iodine or an iodine-containing material. Typical electrolytes included within the scope of the invention are potassium hydroxide and sodium hydroxide. Suitable iodine-containing compounds are iodine, zinc iodide, sodium iodide and potassium iodide. These are used in an amount ranging from 5 percent to their saturation point in the given electrolyte.

Overcharge protection is obtained in accordance with the invention by the electrolytic production of iodine. The recombination reaction of iodine and zinc occurs more easily than that of oxygen and zinc, probably because of the formation of a metal-iodine-oxygen compound in the electrolyte which diffuses through the separator to the zinc anode where oxidation of zinc occurs.

Amalgamation can proceed by surface transport in mechanical contact or chemically by diffusion of Hg ions present in the electrolyte. Their presence is easily obtained in acidic electrolytes either by a simple dissolving of a small quantity of mercury from the amalgamated zinc upon contact with the electrolyte or by the direct addition of a salt of mercury to the electrolyte. These techniques will not work when an alkaline electrolyte is employed, since the $Hg^{++}$ ion concentration in caustic solution is too small. Mercuric oxide precipitates out of KOH when a salt of mercury is dissolved therein. However, the $(HgI_4)^{--}$ complex is stable in caustic solution (e.g., in Nessler's reagent, which consists of KI and $HgCl_2$ in a KOH solution) and is quite suitable for amalgamating zinc in the $MnO_2/KOH/Zn$ cell.

$K_2HgI_4$ may be produced by adding KI to $HgCl_2$ until $HgI_2$ precipitates. The $HgI_2$ is then separated by filtration and dissolved completely in KI solution to form $K_2HgI_4$ which is compatible with KOH. An alternate method of obtaining the iodine complex in KOH involves the simple addition of iodine, KI, or $ZnI_2$ which forms the complex ion upon contact with the amalgamated zinc surface.

In the practice of this invention, it was demonstrated that amalgamated zinc in contact with an unamalgamated zinc sheet did not gas in KOH electrolyte when the $(HgI_4)^{--}$ ion was present. The voltage difference dropped within 5 seconds from 20 to 40 mv. to 5 mv. or less.

Experimentation also demonstrated the effectiveness of the iodide compound in preventing oxygen accumulation and resultant sealing failure of the cells. On charge, the KI in KOH was decomposed at about 1.7 volts (vs. zinc) and iodine was formed at the positive ($MnO_2$) electrode. The voltage did not rise above 1.75 volts.

To demonstrate the success of the invention, a total of 18 cells containing 12 N KOH electrolyte saturated with $ZnI_2$ was tested for one month. Half of these cells were assembled with a semi-permeable separator between layers of fibrous separators. These cells did not develop excessive gas pressure, and exhibited superior performance, namely 0.1 volt higher output than the other cells containing the fibrous separators only. Iodide decomposition apparently prevented the voltage from rising above 1.80 volts on overcharge.

In contrast, similar cells made with semi-permeable membrane separators show approximately 50 percent sealing failures on overcharge.

No detrimental effect of the iodide addition in respect to capacity or shelf behavior has been observed. As is the case with all cells utilizing chemical recombination reactions, the overcharge current must not exceed the equivalent of the transportation rate. It is still possible to explode a cell by accumulation of gas if the charge current is in excess of the diffusion speed of iodine through the separator to the zinc anode. However, iodine diffusion was found to be fairly rapid so that a normal charging rate of approximately 200 to 300 ma. is permissible (500 ma. seems to be the limit for a D-size cell).

The concentration of the iodide material does not appear to be critical except that sufficient iodide should be present to allow for some adsorption of iodide at the cathode. After the initial saturation of the cathode occurs, the excess iodine migrates to the zinc anode and recombines with the zinc. Thus, the minimum amount of iodide necessary is rather difficult to determine since it depends upon the porosity of the $MnO_2$ cathode. KI, $ZnI_2$ or $I_2$, all of which are quite soluble in concentrated KOH, may be added to the solution. Any of the compounds are suitable, although it appears simpler to employ $ZnI_2$. The KOH electrolyte is normally saturated with ZnO (zinc ions constitute an additional precaution against $H_2$ evolution on overcharging); therefore, the use of $ZnI_2$ is similar amounts avoids the necessity of adding both ZnO and KI or $I_2$.

What is claimed is:

1. In a rechargeable dry cell employing as an electrolyte an aqueous solution of a hydroxide of an alkali metal in conjunction with a cathode having manganese dioxide and an anode consisting of zinc, the improvement consisting in adding to said electrolyte an iodine-containing compound, said compound being present in the range of from 5 percent of said electrolyte to its saturation point in said electrolyte, said compound tending to prevent the development of excessive gas pressure upon recharge if said cell.

2. A cell according to claim 1 wherein said iodine-containing compound is an iodide.

3. A cell according to claim 1 wherein said iodine-containing compound is zinc iodide.

4. A cell according to claim 1 wherein said iodine-containing compound is potassium iodide.

5. A cell according to claim 1 wherein said iodine-containing compound is sodium iodide.

6. A cell according to claim 1 wherein said iodine-containing compound is iodine.

References Cited in the file of this patent

UNITED STATES PATENTS

| | | |
|---|---|---|
| 1,662,866 | Salagar | Mar. 20, 1928 |
| 1,716,461 | Portail | June 11, 1929 |
| 1,834,250 | Martus et al. | Dec. 1, 1931 |
| 2,690,465 | Broder | Sept. 28, 1954 |

UNITED STATES PATENT OFFICE
CERTIFICATE OF CORRECTION

Patent No. 2,991,325            July 4, 1961

Karl Kordesch

It is hereby certified that error appears in the above numbered patent requiring correction and that the said Letters Patent should read as corrected below.

Column 3, line 2, for "if" read -- of --.

Signed and sealed this 21st day of November 1961.

(SEAL)
Attest:

ERNEST W. SWIDER            DAVID L. LADD
Attesting Officer            Commissioner of Patents

USCOMM-DC